US011300518B2

(12) United States Patent
Bergmann et al.

(10) Patent No.: US 11,300,518 B2
(45) Date of Patent: Apr. 12, 2022

(54) METHOD FOR DETERMINING A DEGREE OF POLYMERISATION OF A POLYMER

(71) Applicants: COMMISSARIAT À L'ÉNERGIE ATOMIQUE ET AUX ÉNERGIES ALTERNATIVES, Paris (FR); ROQUETTE FRERES, Lestrem (FR)

(72) Inventors: Emeric Bergmann, Grenoble (FR); Jean-Charles Baritaux, Seyssinet-Pariset (FR); Baptiste Boit, La Gorgue (FR); Aline Lecocq, Mouvaux (FR); Veronique Rebuffel, Corenc (FR); Oumar Toure, Bethune (FR); Mathias Ibert, La Chapelle d'Armentieres (FR)

(73) Assignees: COMMISSARIAT À L'ÉNERGIE ATOMIQUE ET AUX ÉNERGIES ALTERNATIVES, Paris (FR); ROQUETTE FRERES, Lestrem (FR)

( * ) Notice: Subject to any disclaimer, the term of this patent is extended or adjusted under 35 U.S.C. 154(b) by 0 days.

(21) Appl. No.: 16/958,110

(22) PCT Filed: Dec. 21, 2018

(86) PCT No.: PCT/FR2018/053526
§ 371 (c)(1),
(2) Date: Jun. 25, 2020

(87) PCT Pub. No.: WO2019/129982
PCT Pub. Date: Jul. 4, 2019

(65) Prior Publication Data
US 2020/0340922 A1    Oct. 29, 2020

(30) Foreign Application Priority Data
Dec. 28, 2017 (FR) ..................... 17 63332

(51) Int. Cl.
*G01N 21/65* (2006.01)
*G01K 7/02* (2021.01)
*G05D 23/22* (2006.01)

(52) U.S. Cl.
CPC ............... *G01N 21/65* (2013.01); *G01K 7/02* (2013.01); *G01N 2201/06113* (2013.01); *G01N 2201/127* (2013.01); *G05D 23/2236* (2013.01)

(58) Field of Classification Search
CPC ............ G01N 21/274; G01N 21/65; G01N 2201/06113; G01N 2201/127
See application file for complete search history.

(56) References Cited

U.S. PATENT DOCUMENTS 5,607,643 A * 3/1997 Xiaoming ............. G01N 21/65
356/244
6,723,804 B1 4/2004 Battiste
(Continued)

FOREIGN PATENT DOCUMENTS

WO    WO 2012/088217 A1    6/2012

OTHER PUBLICATIONS

International Search Report dated Apr. 17, 2019 in PCT/FR2018/053526 filed Dec. 21, 2018, 3 pages.
(Continued)

*Primary Examiner* — Hina F Ayub
(74) *Attorney, Agent, or Firm* — Oblon, McClelland, Maier & Neustadt, L.L.P.

(57) ABSTRACT

A method for determining the degree of polymerization of a polymer is disclosed, the polymer being contained in a sample (2), the method comprising the following steps:
a) illuminating the sample (2) using a laser beam (11) and acquiring (100) a Raman spectrum (S) representative of the polymer;
b) identifying (110) a peak of interest ($P_i$) and determining (120) a position ($v_i$) of the peak of interest in the Raman spectrum;

(Continued)

c) on the basis of the position of the peak of interest, using a calibration function ($f$) to determine a degree of polymerization (DP, DE) of the polymer, the calibration function expressing a variation in the position of the peak of interest as a function of the degree of polymerization of the polymer.

12 Claims, 6 Drawing Sheets

(56) References Cited

U.S. PATENT DOCUMENTS

| | | | |
|---|---|---|---|
| 2003/0068508 A1* | 4/2003 | Iso | G11B 5/7368 428/469 |
| 2003/0194762 A1* | 10/2003 | Kubota | A23L 15/00 435/69.1 |
| 2008/0034833 A1* | 2/2008 | Maier | G01J 3/0297 73/1.01 |
| 2009/0051898 A1* | 2/2009 | Hwang | A61B 5/0075 356/51 |
| 2013/0162989 A1* | 6/2013 | Chen | G01N 21/274 356/301 |
| 2013/0261224 A1 | 10/2013 | Deshpande et al. | |
| 2016/0077009 A1* | 3/2016 | Gargas | G01N 21/9501 356/301 |
| 2017/0045455 A1* | 2/2017 | Robertson | A61M 1/1609 |

OTHER PUBLICATIONS

Dropsit et al., "On the Exploitation of Optical Signal from Raman Spectroscopy for In-Situ Conversion Monitoring of Emulsion Polymerization", AIP Conf. Proc. 1914, (2017), 090006-1-090006-5, XP 55478148, 6 total pages.

Rehman et al., "In situ analysis of the degree of polymerization of bone cement by using FT-Raman spectroscopy", Biomaterials 1996, vol. 17, No. 16, XP 4032968, pp. 1615-1619.

Wilson et al., "Effects of different preparation procedures during tooth whitening on enamel bonding", J Mater Sci: Mater Med (2009), vol. 20, XP 19680199, pp. 1001-1007.

Vanska et al., "Effect of water vapor in air on thermal degradation of paper at high temperature", Polymer Degredation and Stability vol. 99 (2014),XP 28670914, pp. 283-289.

* cited by examiner

METHOD FOR DETERMINING A DEGREE OF POLYMERISATION OF A POLYMER

TECHNICAL FIELD

The technical field of the invention is a method for determining a degree of polymerization of a polymer, in particular a glucose polymer, implementing an analysis by Raman spectroscopy.

Prior Art

Starch is a natural bio polymer synthesized by plants. It is one of the most abundant biomass materials in nature. It is a polysaccharide of formula $(C_6H_{10}O_5)_n$ the monomer of which is the D (dextrorotatory) isomer of glucose.

Hydrolysis of starch allows products intended for the food-processing industry to be obtained. More precisely, it may allow maltodextrins, liquid glucose syrups and dried glucose solutions to be obtained in the form of dry powders and in particular white powders. These products may be used as a source of carbohydrates for dietary purposes, for example in infant foods or sports supplements. They may also be used in applications related to fermentation, for example in the field of baking or brewing. Other uses relate to the production of food products, for example, non-exhaustively, biscuits, confectionery, charcuterie or sweeteners. These products may also be used as a texturing agent in a food product.

The properties of the products of the hydrolysis of starch depend on the degree of hydrolysis. The latter may be expressed by an indicator designated by the acronym DE, meaning dextrose equivalent. Pure dextrose, obtained after complete hydrolysis of starch, has a DE equal to 100. Maltodextrins have a dextrose equivalent lower than or equal to 20, whereas glucose syrups have a dextrose equivalent comprised between 20 and 100. The properties of the products depend on their degree of hydrolysis. For this reason it is useful to monitor the hydrolysis of starch, so as to control the dextrose equivalent of the products of the hydrolysis.

Dextrose equivalent is usually expressed in grams of anhydrous D-glucose per 100 grams of dry matter. D-glucose is usually designated by the term dextrose. During the hydrolysis of starch, the degree of polymerization DP gradually decreases, whereas the dextrose equivalent DE gradually increases, this being evidence of the obtainment of short molecules. Thus, the dextrose equivalent expresses the degree of conversion of starch into dextrose. It also depends on the degree of polymerization, the degree of polymerization (DP) increasing as the dextrose equivalent DE decreases.

Dextrose equivalent may be determined by chemical or electrochemical analyses, such as for example described in document EP0451811.

Raman-spectroscopy methods have already been employed to study the spectra of the component molecules of starch. The objective of these studies was to establish a Raman signature of these molecules, by establishing correlations between the position or relative amplitude of various peaks in Raman spectra, and particular molecular states.

Moreover, the publication by Dropsit E "On the exploitation of optical signal from Raman spectroscopy for in-situ conversion monitoring of emulsion polymerization", AIP conference proceedings, 1914, 090006 (2017), describes a method for monitoring a polymerization of styrene. This results in a decrease in the amplitude of a peak representative of styrene (999 cm$^{-1}$) and an increase in the amplitude of a peak representative of polystyrene (1001 cm$^{-1}$). These peaks are not split by the detector used. Thus, they form one apparent peak, which shifts depending on the relative proportions of styrene and polystyrene. The peaks in question are specific to the monomer and polymer in question.

The inventors have developed a method allowing the dextrose equivalent of a product resulting from the hydrolysis of starch to be estimated. More generally, the developed method allows a degree of polymerization of a product contained in the sample to be estimated. It is particularly easy to implement in applications such as industrial process control.

SUMMARY OF THE INVENTION

A first subject of the invention is a method for determining a degree of polymerization of a polymer, contained in a sample, comprising the following steps:
 a) illuminating the sample using a laser beam and obtaining a Raman spectrum representative of the sample;
 b) identifying a peak of interest and determining a position of the peak of interest in the Raman spectrum;
 c) on the basis of the position of the peak of interest, using a calibration function to determine a degree of polymerization of the polymer, the calibration function expressing a variation in the position of the peak of interest as a function of the degree of polymerization of the polymer.

The position of the peak of interest may notably be a position of an apex of the peak of interest in the spectrum. It may also be a question of a limit of the peak of interest.

Preferably, the calibration function establishes a relationship between the position of the peak of interest and the degree of polymerization of the polymer. The relationship is preferably bijective.

The calibration function may depend on experimental conditions, and notably on the amount of dry matter in the sample and/or on temperature.

Step b) may comprise, prior to the determination of the position of the peak of interest, processing the Raman spectrum, this comprising at least one of the following operations:
 smoothing the Raman spectrum, to obtain a smoothed Raman spectrum;
 extracting a baseline and subtracting the latter from the Raman spectrum or from the smoothed Raman spectrum;
 taking into account a parametric fitting function and fitting the peak of interest using the parametric fitting function, then determining the position of the peak of interested thus fitted.

The processing of the Raman spectrum may comprise taking into account a parametric statistical fitting function and fitting the peak of interest using the latter. The fitting function may for example be of Gaussian or Lorentzian type. The determination of a parameter of the fitting function allows the position of the peak of interest to be established.

According to one embodiment, the polymer is a glucose polymer, and more precisely D-glucose, or dextrose. It may be a question of a product derived from the hydrolysis of starch, in which case the method allows the hydrolysis of the starch to be monitored. The determined degree of polymerization may be expressed by an index, called the dextrose equivalent, representing an amount of dextrose present in the sample relative to an amount of dry matter present in the sample.

The peak of interest may be located in a spectral band extending between 2800 cm$^{-1}$ and 3020 cm$^{-1}$. It may lie in the spectral band 2850 cm$^{-1}$-2940 cm$^{-1}$ or 2940 cm$^{-1}$-2980 cm$^{-1}$, or 2980 cm$^{-1}$-3010 cm$^{-1}$.

The method may comprise acquiring a plurality of successive Raman spectra, the latter being added to obtain the Raman spectrum representative of the sample.

The calibration function may be obtained by implementing steps a) and b) using, successively, calibration samples the degree of polymerization of which is known.

A second subject of the invention is a device for determining a degree of polymerization of a polymer, the device comprising
- a light source, notably a laser source, configured to direct a light beam toward a sample comprising the polymer;
- a spectrometer, configured to acquire a Raman spectrum of the sample under the effect of its illumination by the light beam;
- a processor, configured to implement steps b) and c) of a method according to the first subject of the invention, on the basis of the Raman spectrum acquired by the spectrometer.

Other advantages and features will become more clearly apparent from the following description of particular embodiments of the invention, which embodiments are given by way of non-limiting examples, and shown in the figures listed below.

DESCRIPTION OF PARTICULAR EMBODIMENTS

Figure 1:
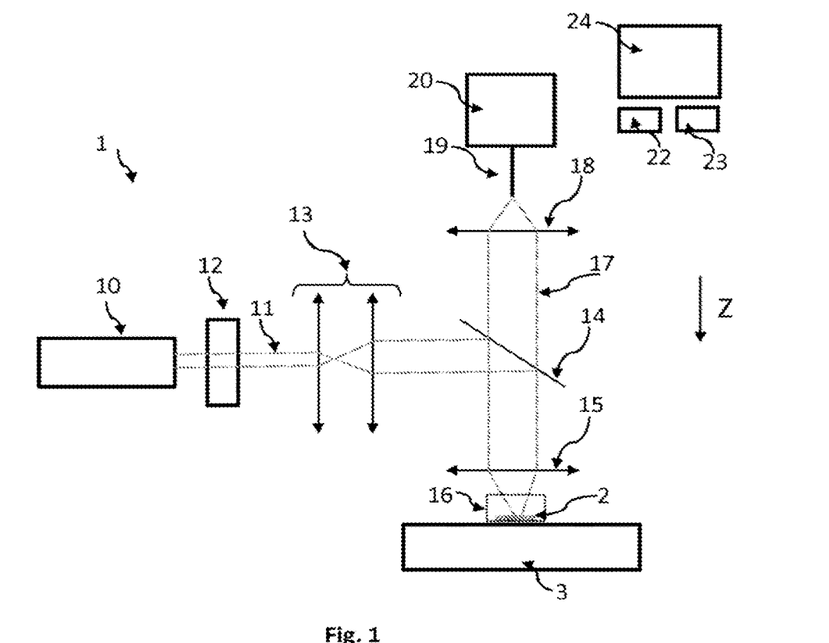
FIG. 1 shows the schematic of a device allowing the invention to be implemented.

FIG. 1 is an example of an embodiment of a device 1 allowing the invention to be implemented. A laser light source 10, for example of helium-neon type, is configured to generate a, preferably monochromatic, illuminating beam 11 that propagates to a sample 2 to be analyzed, the sample being placed on a holder 3. The illuminating beam is attenuated by an optical density 12, then is widened by an optical system 13 comprising two lenses, before being reflected by a plate 14 toward the sample 2, along an axis of propagation Z. An objective 15 allows the illuminating beam 11 to be focused on the sample. Under the effect of the illumination by the illuminating beam 11, the sample generates response light radiation 17. The response radiation 17 is radiation scattered by the sample, in particular by the process usually called spontaneous Raman scattering. In this example, the response radiation propagates along the axis Z, in a direction opposite to the illuminating beam 11.

Raman spectroscopy is a very widespread characterizing tool that is based on the acquisition of a spectrum of radiation inelastically scattered by a sample, the sample being exposed to monochromatic incident light radiation. A Raman spectrum is generally displayed in the form of a spectrum. This spectrum is a histogram of a wavenumber v, referred to as the differential wavenumber, representing a difference between the wavenumber $v_{17}$ of the detected response radiation 17 and the wavenumber $v_{11}$ of the illuminating beam 11. The differential wavenumber v corresponds to the Raman shift. This spectrum, which is called the Raman spectrum, represents a signature of the atomic vibrational bonds of the component molecules of the analyzed sample.

In the example shown in FIG. 1, the response radiation 17 is transmitted by the plate 14 to a focusing optic 18. It converges toward an optical fiber 19, the latter being connected to a spectrometric photodetector 20, which is able to acquire therefrom a Raman-scattering spectrum. In this example, the photodetector 20 is a Raman spectrometer supplied by Tornado Spectral Systems under the reference HyperFluxU1. It is connected to a processor 22, for example a microprocessor, allowing instructions of the method described below to be implemented. The microprocessor is connected to a memory 23 in which these instructions are stored. It may also be connected to a display screen 24.

According to one variant, the device may comprise a unit 16 for regulating the temperature of the sample, comprising a temperature sensor, a thermocouple for example, and a heating means, for example a resistive heater or a hot plate, so as to control the temperature of the sample 2. It is a question of keeping it at or close to a setpoint temperature.

The inventors have performed Raman-spectrum acquisitions on various samples resulting from enzymatic hydrolysis of starch. Each sample has a known and invariant dextrose equivalent DE. The samples either take the form of a powder, or the form of syrups. The powder or syrup samples are diluted in deionized water before being analyzed. It is preferable for the amount of dry matter in the samples to be controlled. In the trials described below, the amount of dry matter in the samples was 30%.

Figure 2A:
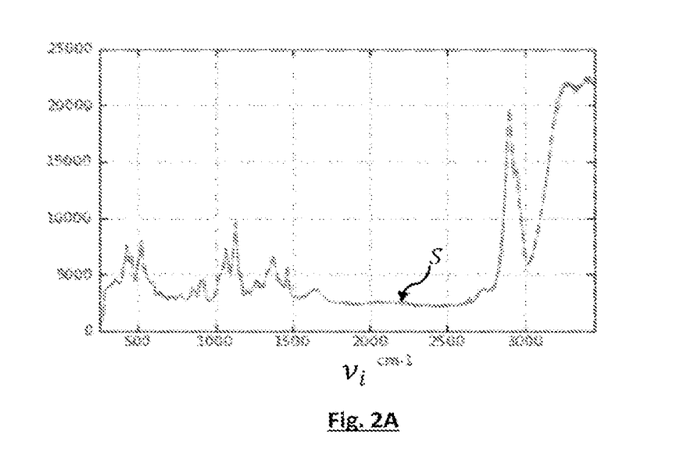
FIG. 2A shows a Raman spectrum acquired from a sample the DE (dextrose equivalent) index of which is equal to 100.
Figure 2B:
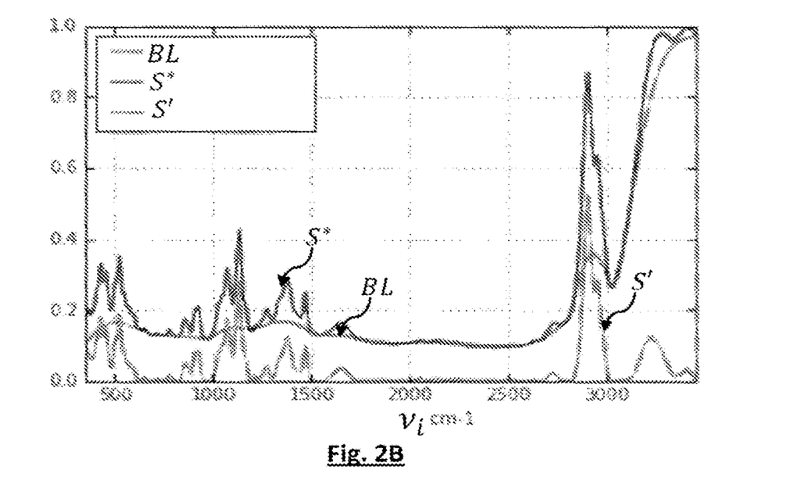
FIG. 2B illustrates various stages of processing of the Raman spectrum shown in FIG. 2A.

FIG. 2A shows an example of a Raman spectrum S of a sample of dextrose monohydrate, the DE of which is equal to 100%. Before the spectrum is exploited, it is preferable to perform pre-processing, this comprising operations known to those skilled in the art, and in particular:
- smoothing the acquired spectrum S, for example by applying a median filter, possibly followed by application of a Savitsky-Golay filter. This allows a smoothed spectrum S*, as shown in FIG. 2B, to be obtained;
- extracting a baseline BL of the spectrum. The baseline BL may be obtained by applying a Clayton filter to the acquired spectrum S;
- subtracting the baseline from the smoothed spectrum, so as to obtain a processed spectrum S'=S*−BL.

FIG. 2B shows the smoothed spectrum S*, the baseline BL and the processed spectrum S' that result from the acquired spectrum S shown in FIG. 2A.

Figure 2C:
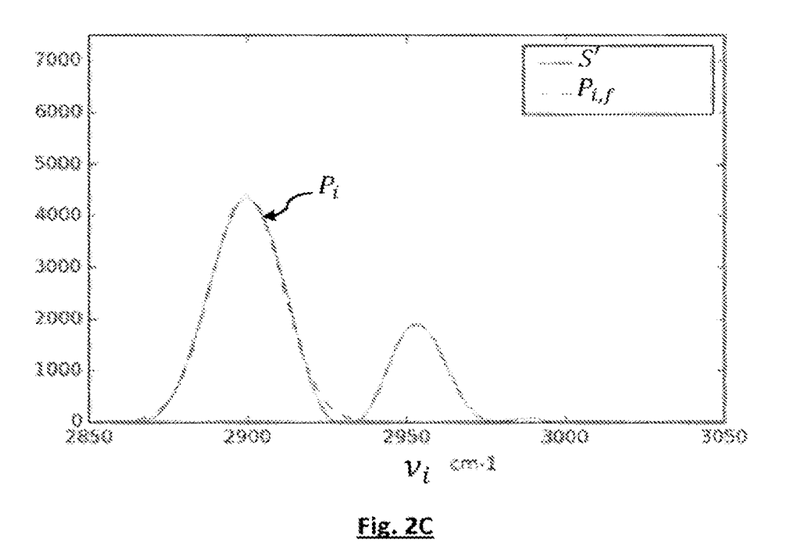
FIG. 2C shows a region of interest of the processed Raman spectrum.

A region of interest of the processed spectrum is then selected. In the application given as example, i.e. monitoring of the hydrolysis of starch, the region of interest in question is comprised between 2850 cm$^{-1}$ and 3050 cm$^{-1}$. FIG. 2C shows the selected region of interest. It contains three peaks: the first peak lies at about 2900 cm$^{-1}$, the second peak lies at about 2950 cm$^{-1}$ and the third peak lies at about 2985 cm$^{-1}$, this third peak being of very low amplitude.

In the rest of the description, the first peak, which is referred to as the peak of interest $P_i$, and a position $v_i$ of which it is sought to determine, will initially be considered. By position, what is meant is a coordinate representative of the peak along the x-axis, i.e. the axis representing the wavenumber. It is conventional to consider the position of the apex of the peak. Other positions may be considered, for example a mean (centroid) of the peak, a median or an upper limit or a lower limit. In the field of the processing of spectra, it is conventional to determine the position of a peak by carrying out a parametric fit of the shape of the peak using a parametric fitting function, for example a statistical function of Gaussian type. The fitting step consists in determining the parameters of the fitting function that lead to the best fit of the shape of the peak. If it is a question of a Gaussian function, the determined parameters are the mean $\mu$, the standard deviation $\sigma$, and the amplitude. The position of the peak is obtained depending on the parameters of the Gaussian function, and in particular the mean $\mu$, which indicates the position of the apex of the peak. The term fitted peak designates the peak obtained after fitting with the fitting function taken into account. The fitting may be carried out using another statistical function, a Lorentzian function for example. The fitting function may be a polynomial function, or a preset shape, for example a triangular shape or a trapezoidal shape. The fit allows a position $v_i$ of the peak of interest $P_i$ to be determined.

In FIG. 2C the peak of interest $P_i$ of the processed spectrum S' mentioned with reference to FIG. 2B has been drawn with a solid line, and a fit $P_{i,f}$ of the peak of interest with a Gaussian function has been drawn with a dashed line.

Figure 2D:
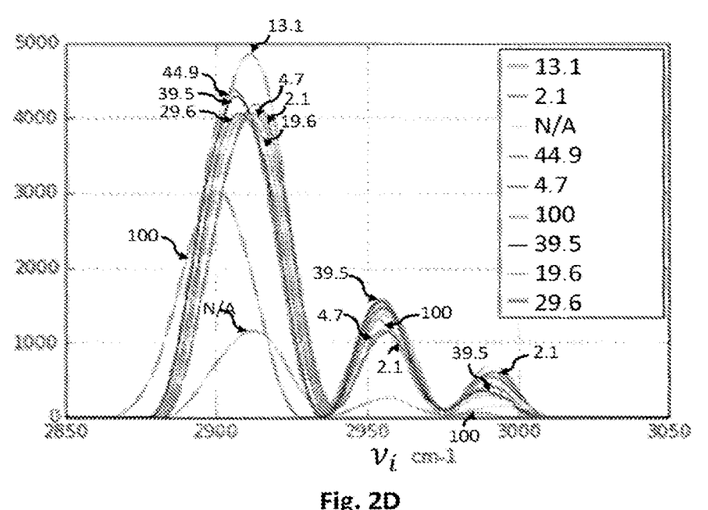
FIG. 2D shows the variation in a peak of interest as a function of the index DE of various samples.

The inventors have used various samples, respectively having various dextrose-equivalent (DE) indices, these indices being comprised between 2.1 and 100. FIG. 2D shows the processed spectra S' in the region of interest in question. More precisely, in FIG. 2D, the peak of interest $P_i$ has been referenced for each sample, each peak corresponding to one DE index. One curve, referenced N/A, corresponds to a sample the dextrose equivalent of which is unknown.

An important element of the invention results from the observation that the more the DE index increases, the more the position $v_i$ of the centre of the peak of interest shifts toward low wavenumbers. This position is in the vicinity of 2900 cm$^{-1}$ when DE=100%, and gradually approaches 2912 cm$^{-1}$ as DE tends toward 2%. Thus, because of this gradual shift, the position $v_i$ of the peak of interest $P_i$ in the spectrum is a reliable indicator of the DE index of the analysed sample.

FIG. 2D shows that another parameter, for example the amplitude of the peak of interest, seems to vary more independently of the DE index and is not a good indicator of DE index.

Figure 2E:
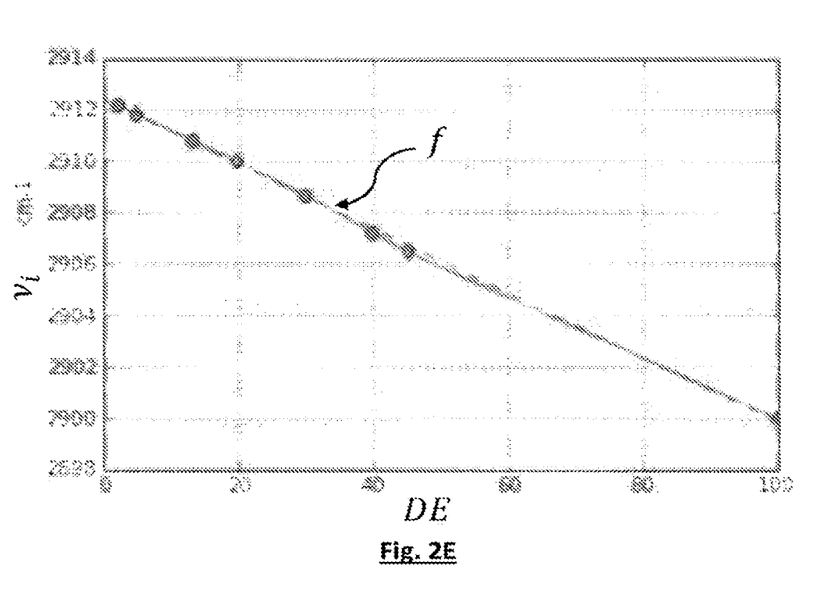
FIG. 2E is a curve showing the variation in a position of the apex of the peaks of interest shown in FIG. 2D, as a function of the DE index.

The position $v_i$ of the centre of the various peaks of interest shown in FIG. 2D was precisely determined by implementing a Gaussian fit. FIG. 2E shows the variation in this position (y-axis) as a function of the DE index (x-axis). This variation is, at least to the first order, linear and of equation:

$$v_i = a \times DE + b \text{ with } a = -0.1257 \text{ and } b = 2.912 \times 10^3. \quad (1)$$

It is also possible to determine the variation in the DE index as a function of the position $v_i$ of the peak:

$$(1), \text{ with } c = -7.957 \text{ and } d = 2.317 \times 10^4. \quad (2)$$

This shows that there is a bijective relationship between the position $v_i$ of the peak of interest in the spectrum, i.e. the wavenumber representative of the peak, and the DE index. This relationship is valid for a certain amount of dry matter, corresponding to the amount of dry matter of the samples used to establish the relationship. The measurement of the position of the peak therefore allows an estimation of the DE index of the sample. By bijective relationship, what is meant is that to one DE value there corresponds a single wavenumber value, and vice versa.

The variation in the position $v_i$ of the peak of interest may also be observed for the peak of the Raman spectrum lying between 2940 cm$^{-1}$ and 2980 cm$^{-1}$. In FIG. 2D, the peaks, in the spectral band 2940 cm$^{-1}$-2980 cm$^{-1}$, corresponding to DE indices of 2.1, 4.7, 39.5 and 100, respectively, have been labelled. A gradual shift of the peak, toward lower wavenumbers, as the DE index increases may again be seen.

The same conclusion may be drawn by observing the gradual shift of the Raman peak lying in the spectral band 2980 cm$^{-1}$-3010 cm$^{-1}$. In FIG. 2D, the peaks, in the spectral band 2980 cm$^{-1}$-3010 cm$^{-1}$, corresponding to DE indices of 2.1, 39.5 and 100, respectively, have been labelled. A gradual shift of the peak, toward lower wavenumbers, as the DE index increases may again be seen.

Thus, the variation in the position $v_i$ of the peak as a function of the DE index affects a plurality of peaks of interest of the Raman spectrum.

Expression (2), which was described with reference to FIG. 2E, is a calibration function $f$, established on the basis of samples the DE index of which is known. It may be used to determine the DE index of an unknown sample, on the basis of a position $v_i$ of a peak of interest $P_i$ of a Raman spectrum. Thus, the invention allows the DE index of an unknown sample to be determined by carrying out the following steps, which are described with reference to FIG. 3A.

Figure 3A:
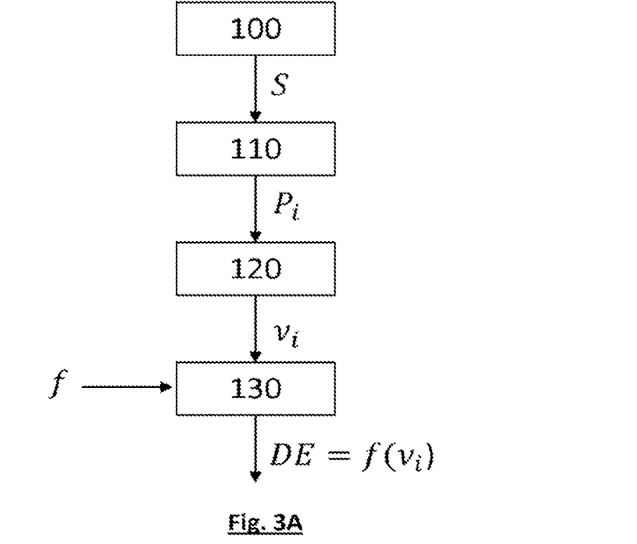
FIG. 3A schematically shows the main steps of a method according to the invention.

Step 100: acquiring a Raman spectrum of the sample. It is a question of obtaining a Raman spectrum S of the sample, for example using the device described with reference to FIG. 1. It is possible to acquire, successively, a plurality of Raman spectra, the latter then being added to form a Raman spectrum S representative of the sample.

Step 110: selecting a peak of interest $P_i$, in a spectral band of interest $\Delta\lambda_i$ known a priori. In this example, the spectral band is comprised between 2850 cm$^{-1}$ and 2940 cm$^{-1}$.

Step 120: determining a position $v_i$ of the peak of interest $P_i$. This step may be carried out by means of processing of the acquired spectrum followed by fitting of the peak of interest $P_i$ with a fitting function, as described above. The position $v_i$ may be the position of the apex of the peak, or its mean, or its median, or an upper and/or lower limit bounding the peak.

Step 130: applying a calibration function, to determine a degree of polymerization, or an index related to the degree of polymerization, for example the DE index, by applying the calibration function. Thus, DE=$f(v_i)$, where $v_i$ is the position of the peak of interest, which position is determined in step 120, and $f$ is the calibration function taken into account. It is also possible to use a calibration function g, such that DP=$g(v_i)$, DP designating the degree of polymerization and g corresponding to a calibration function relating the position $v_i$ of the peak of interest $P_i$ to the degree of polymerization DP.

Figure 3B:
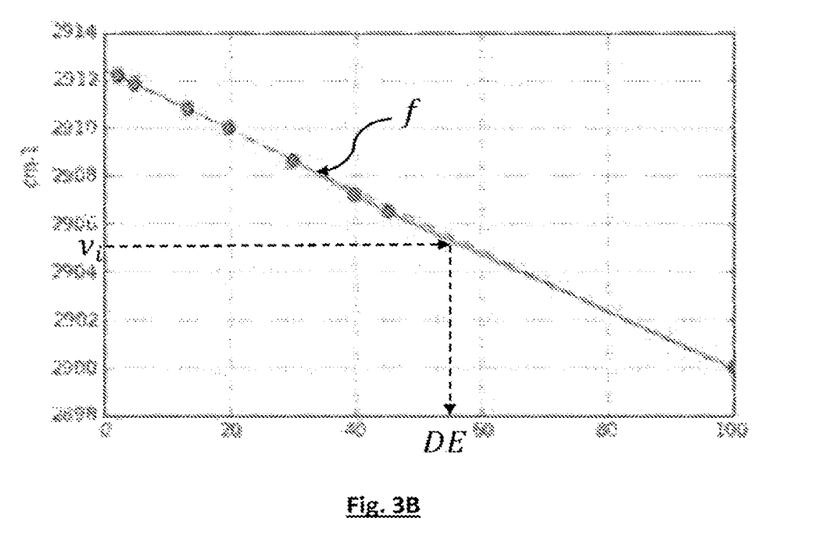
FIG. 3B shows an example of use of a calibration function.

For example, if a position $v_i = 2905$ cm$^{-1}$ is measured, application of the calibration function $f$ allows an estimation of a DE index of about 59% to be achieved, as shown in FIG. 3B by the dashed arrows.

The calibration function $f$ is preferably obtained by determining a variation in the position of the peak of interest using calibration samples, the respective DE indices, or the respective degrees of polymerization DP, of which are different from one another and known.

The invention may be employed to monitor, on-line, the hydrolysis of starch. Generally, the hydrolysis of starch, also designated by the term saccharification, is employed in the food-processing industry in tanks of large volume. The invention may be applied to samples taken from a tank, or to a bypass of the latter. It allows the DE index to be determined in real time, this being a notable progress with respect to chemical analyzing methods. The invention is more easily automatable.

The inventors have observed that the relationship established between the DE index and the position $v_i$ of the peak of interest may vary depending on experimental parameters, for example the temperature of the sample. Thus, preferably, the device comprises a unit 16 for regulating temperature, as mentioned above, in order to control the temperature of the sample. Otherwise, the temperature of the sample may be measured and a calibration function accounting for the measured temperature applied. Taking into account temperature, or controlling it, allows the precision of the estimation of the degree of polymerization or the degree of dextrose equivalent to be increased.

The invention has been applied to the characterization of the degree of polymerization of a polymer of polyvinyl alcohol (PVA). Polymers in the powder state were diluted, so as to obtain a percentage of dry matter of about 7%. The powders were mixed with deionized water, then subjected to ultrasound for 20 hours so as to improve their solubility. 200 Raman spectra were acquired per sample. For each sample, the spectra were summed so as to obtain an average spectrum, considered to be representative of the sample. The degree of polymerization DP of each powder is characterized by its molar weight (mw), the degree of polymerization conventionally being considered to be dependent on molar weight. Three samples the respective molar weights of which were 27000, 31000 and 130000 g·mol$^{-1}$ were used.

Figure 4A:
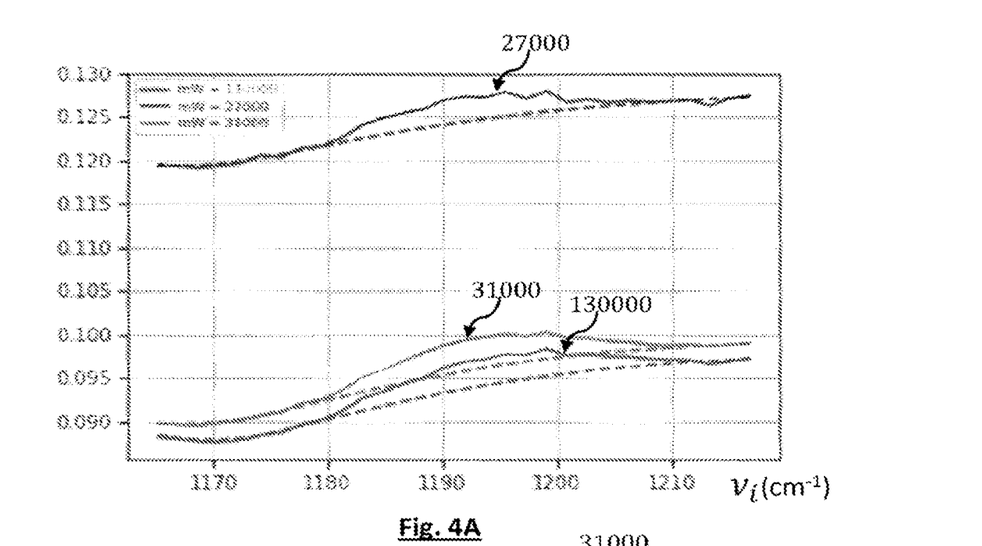
FIGS. 4A and 4C show regions of interest of Raman spectra acquired on various samples containing polyvinyl alcohol having various degrees of polymerization.
Figure 4B:
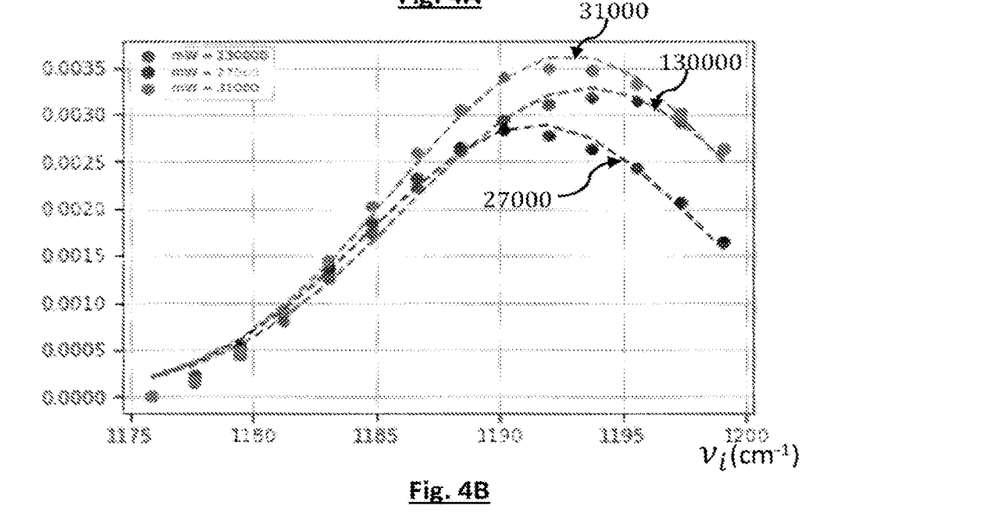
FIGS. 4B and 4D are details of the regions of interest shown in FIGS. 4A and 4C, respectively.
Figure 4C:
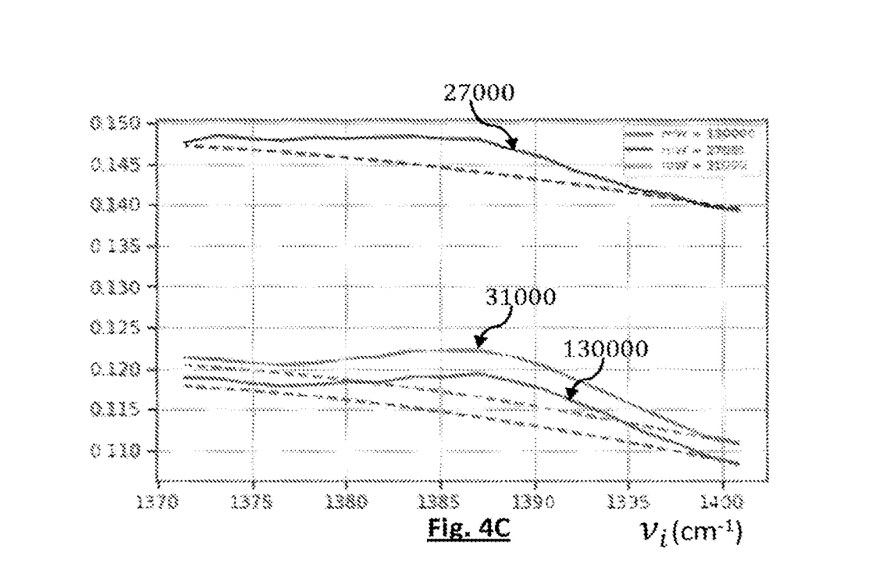

FIGS. 4A and 4C respectively show the average spectrum in two regions of interest: between 1180 cm$^{-1}$ and 1200 cm$^{-1}$ (FIG. 4A) and between 1380 cm$^{-1}$ and 1400 cm$^{-1}$ (FIG. 4C). The spectra underwent processing similar to that described above: smoothing, extraction of the baseline and Gaussian fitting. In FIGS. 4A and 4C, the baselines are shown by dashed curves.

Figure 4D:
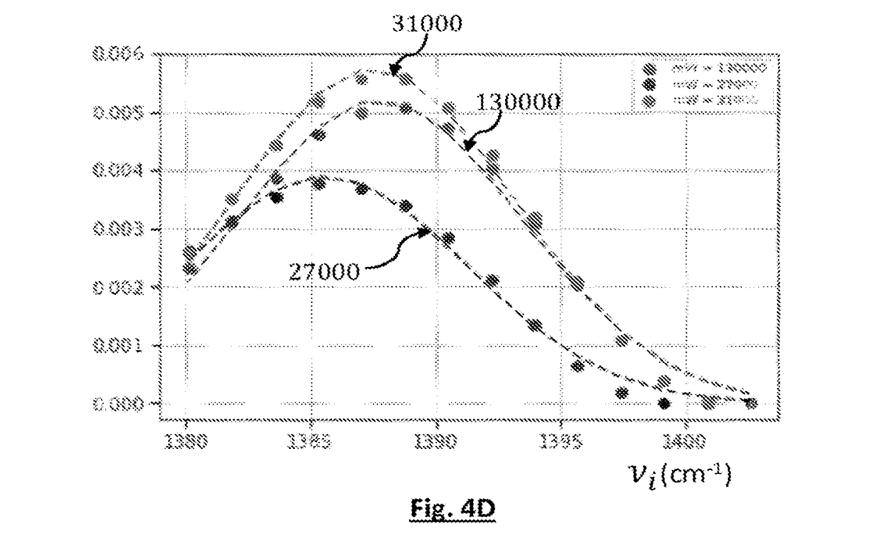

FIGS. 4B and 4D show, following the processing performed on the Raman spectrum, the peaks obtained around 1190 cm$^{-1}$ and 1390 cm$^{-1}$, respectively. A movement of the center of the peak as a function of the molar weight (wt) may be seen. Table 1 collates the position of the apex of each peak as a function of molar weight (mw):

TABLE 1

| mw | 27000 | 31000 | 130000 |
| --- | --- | --- | --- |
| 1180 cm$^{-1}$ and 1200 cm$^{-1}$ | 1191.52 | 1192.87 | 1193.65 |
| 1380 cm$^{-1}$ and 1400 cm$^{-1}$ | 1385.58 | 1387.53 | 1387.77 |

The higher the molar mass, the more the position of the peak shifts toward higher wavenumber values.

The invention may be applied to other polymers, so as to determine a degree of polymerization DP based on a calibration function $f$ established using samples the degree of polymerization DP of which is known, and allowing a, preferably bijective, relationship, between the position $v_i$ of a peak of interest $P_i$ and the degree of polymerization DP to be established.

The invention will possibly be used in various applications, for example in the field of food processing or in the field of the chemical industry. It will possibly be applied to sampled samples or to on-line process control.

The invention claimed is:

1. A method for determining a degree of polymerization of a polymer, contained in a sample, comprising:
    a) identifying at least one peak of interest in a Raman spectrum of the polymer the position of which varies in direct relationship to the degree of polymerization of the polymer;
    b) preparing a calibration function based on known samples which correlates variation of the position of the peak of interest with the degree of polymerization;
    c) collecting a sample of the polymer for which a degree of polymerization is to be determined;
    d) illuminating the sample using a laser beam and obtaining a Raman spectrum representative of the sample;
    e) determining a position of the peak of interest in the Raman spectrum; and
    f) based on the position of the peak of interest, using the calibration function to determine the degree of polymerization of the polymer;
    wherein the peak of interest is located in a spectral band extending between 2800 cm$^{-1}$ and 3020 cm$^{-1}$.

2. The method of claim 1, wherein the position of the peak of interest is a position of an apex of the peak of interest in the spectrum.

3. The method of claim 1, further comprising, prior to determining the position of the peak of interest, processing the Raman spectrum, with at least one of:
    smoothing the Raman spectrum, to obtain a smoothed Raman spectrum;
    extracting a baseline and subtracting the baseline from the Raman spectrum or from the smoothed Raman spectrum;
    taking into account a parametric fitting function and fitting the peak of interest using the parametric fitting function.

4. The method of claim 3, wherein the processing of the Raman spectrum comprises fitting the peak of interest employing a Gaussian parametric fitting function or a Lorentzian parametric fitting function.

5. The method of claim 1, wherein the polymer is a glucose polymer.

6. The method of claim 5, wherein the glucose polymer is a product derived from the hydrolysis of starch, the method comprising monitoring a state of hydrolysis of the starch, using the degree of polymerization obtained.

7. The method of claim 5, wherein the degree of polymerization obtained is a dextrose equivalent index, representing an amount of dextrose present in the sample over an amount of dry matter present in the sample.

8. The method of claim 7, wherein the calibration function is such that the more the dextrose equivalent index increases, the more the position of the center of the peak of interest shifts toward lower wavenumbers.

9. The method of claim 1, wherein a plurality of successive Raman spectra are acquired and the successive Raman spectra are combined to obtain the Raman spectrum representative of the sample.

10. The method of claim 1, wherein the peak of interest is at least one located in a spectral band selected from the group consisting of the band extending between 2850 cm$^{-1}$ and 2940 cm$^{-1}$, the band extending between 2940 cm$^{-1}$ and 2980 cm$^{-1}$, and the band extending between 2980 cm$^{-1}$ and 3010 cm$^{-1}$.

11. A device for determining a degree of polymerization of a polymer, the device comprising:
   a laser source, configured to emit a light beam in order to illuminate a sample comprising the polymer;
   a spectrometer, configured to acquire a Raman spectrum of the sample when illuminated by the light beam; and
   a processor, configured to implement e) and f) of the method of claim 1, using the Raman spectrum acquired by the spectrometer.

12. The device of claim 11, further comprising a unit for regulating the temperature of the sample, so as to keep the temperature of the sample at a setpoint temperature.

\* \* \* \* \*